United States Patent [19]
Mery et al.

[11] Patent Number: 5,881,848
[45] Date of Patent: Mar. 16, 1999

[54] DISK BRAKE USING A PAD WHICH IS URGED TO ROTATE

[75] Inventors: Jean Claude Mery, Pavillons-Sous-Bois; Jean Charles Maligne, Aubervilliers, both of France

[73] Assignee: Bosch Systems De Freinage, Drancy, France

[21] Appl. No.: 648,116

[22] PCT Filed: Apr. 23, 1996

[86] PCT No.: PCT/FR96/00615

§ 371 Date: May 21, 1996

§ 102(e) Date: May 21, 1996

[87] PCT Pub. No.: WO96/41966

PCT Pub. Date: Dec. 27, 1996

[30] Foreign Application Priority Data

Jun. 8, 1995 [FR] France .................................. 95 06744

[51] Int. Cl.⁶ .................................................. F16D 65/40
[52] U.S. Cl. ..................................... 188/73.38; 188/205 A
[58] Field of Search ............................. 188/73.38, 73.36, 188/73.45, 73.44, 205 A, 73.1, 71.1, 250 E, 250 G

[56] References Cited

U.S. PATENT DOCUMENTS

| | | | |
|---|---|---|---|
| 4,467,897 | 8/1984 | Kubo et al. | 188/73.38 |
| 4,560,037 | 12/1985 | Gumkowski et al. | 188/73.38 |
| 5,551,537 | 9/1996 | Mery et al. | 188/73.39 |

FOREIGN PATENT DOCUMENTS

| | | | |
|---|---|---|---|
| 4240872 | 6/1994 | Germany | 188/73.38 |

*Primary Examiner*—Peter M. Poon
*Attorney, Agent, or Firm*—Leo H McCormick, Jr.; Warren Comstock

[57] ABSTRACT

A disk brake for a motor vehicle having a caliper (1), a carrier (2) which fixed to the vehicle and a pad (41) located between a tip (10) on the caliper (1) and a disk (D). The pad (41) being fitted with a spring (5) which holds the pad against the tip (10) of the caliper (1). The spring (5) bears elastically on inclined surfaces of the tip (10) of the caliper (1) and is subjected to a torque (C—C) which urges the spring (5) to rotate about an axis (X) and to continually urge the spring (5) against the carrier (2).

6 Claims, 2 Drawing Sheets

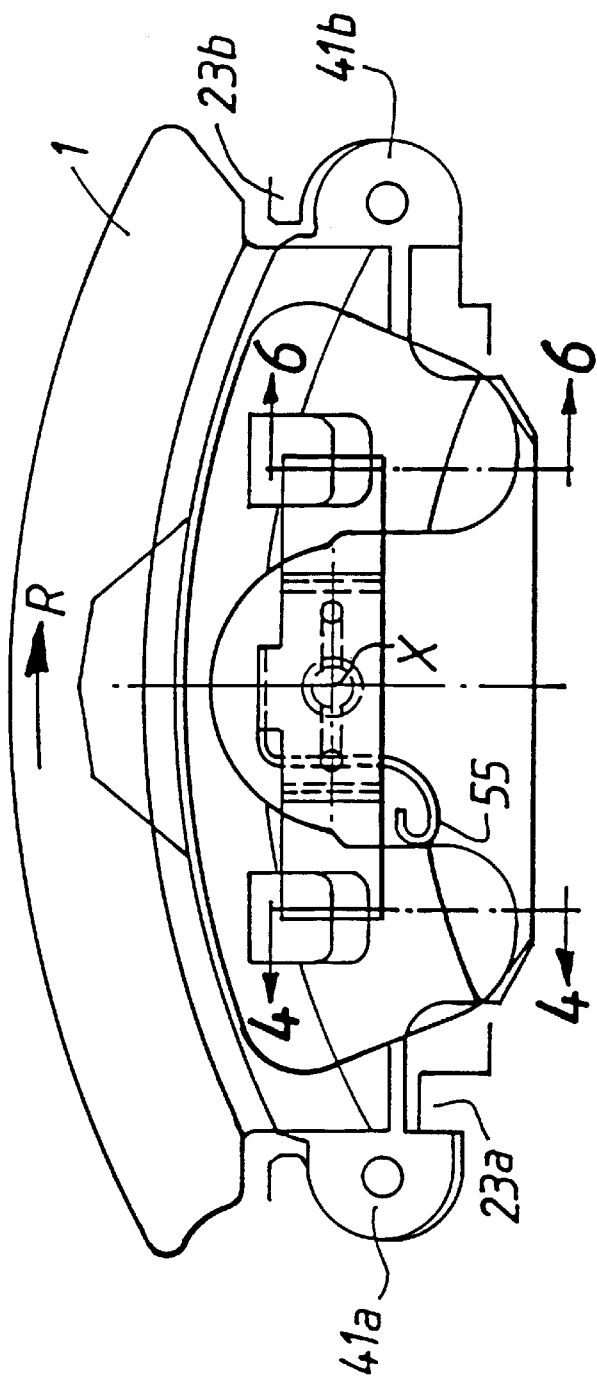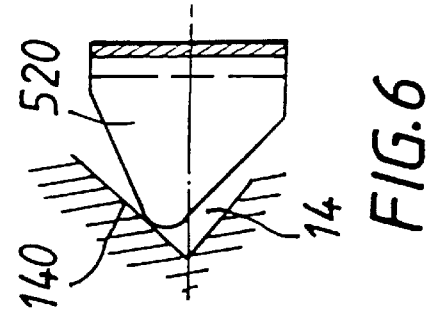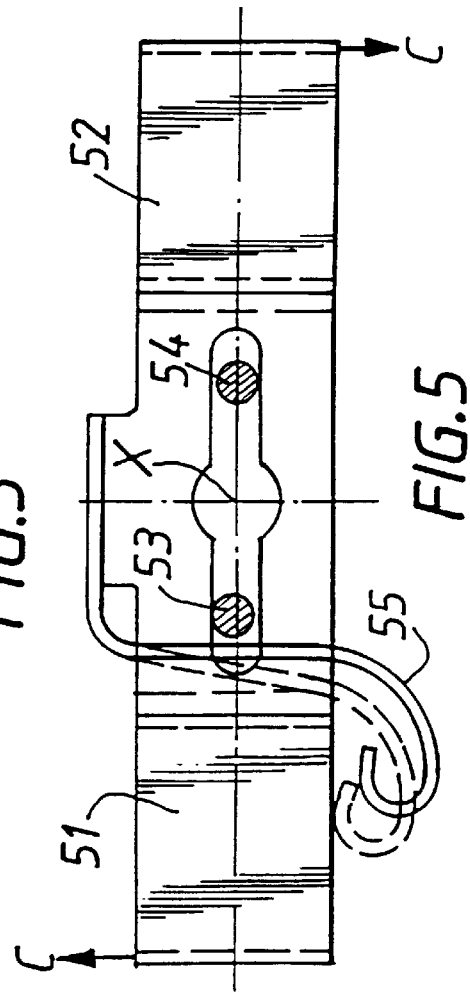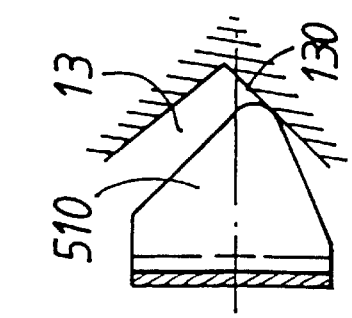

DISK BRAKE USING A PAD WHICH IS URGED TO ROTATE

The present invention relates to a disk brake for a motor vehicle, comprising: two brake elements which can move with respect to each other, one of which is a caliper straddling a brake disk and the other of which is a carrier fixed to the vehicle; clamping means comprising a tip of the caliper, the tip consisting of a flat shaping of the caliper formed facing a first face of the disk, and a cylinder connected to the caliper and closed by a piston turned toward a second face of the disk; guide means allowing the caliper to slide with respect to the carrier under the effect of urging from the clamping means; and first and second friction pads turned respectively toward the first and second faces of the disk, clamped between the piston and the tip of the caliper and moved in an axial direction of the piston by urging from the clamping means until they are applied against the disk; each of the two pads exhibiting two substantially flat faces, the first of which is partially covered with a friction material, and two lateral lugs; the first and second lugs of the first pad interacting with first and second respective supports of the carrier; and the first pad carrying, on its second face, an elongate spring, with two main branches, which points in a tangential direction of the disk and is intended to hold the first pad on the tip of the caliper and elastically clamps the tip of the caliper between the respective free ends of its two branches and the second face of the first pad.

BACKGROUND OF THE INVENTION

Devices which comply with this definition, which encompasses a number of disk brakes, are well known in the prior art, as shown, for example, in the documents U.S. Pat. No. 4,082,166 and EP-A-0 112 255.

One of the problems posed in disk brakes, particularly those which use pads of the type identified previously, lies in the difficulty of giving the pad, particularly the so-called "outboard" pad which is distant from the piston, a predetermined and reproducible position.

This difficulty is particularly troublesome if the pad is attached to the carrier and/or assumed to bear continuously against it, poor positioning of the pad with respect to the caliper then giving rise upon braking to a transient condition which is both noisy and ineffective.

The invention falls within this context and its object is to provide a braking device which, although it is of simple structure, ensures that the outboard pad has a predetermined and reproducible position with respect to the carrier.

SUMMARY OF THE INVENTION

To this end, the brake of the invention, which in other respects complies with the preamble hereinabove, is essentially characterized in that the ends of the two main branches of the spring point toward the tip of the caliper and bear elastically against respective bearing surfaces of the tip of the caliper, in that the bearing surfaces are inclined both with respect to the axial direction of the piston and with respect to the first face of the disk, and in that the bearing surfaces exhibit opposite slopes with respect to the axial direction of the piston, so as partially to convert the elastic bearing of the free ends of the branches of the spring on the bearing surfaces into a torque urging the first pad to rotate about an axis parallel to the axial direction of the piston.

For example, the bearing surfaces may be formed by the edges of two respective V-shaped grooves cut in the tip of the caliper, and the free ends of the branches of the spring are preferably cut into a point with a rounded end.

The features of the invention are particularly useful in a brake in which the first lateral lug of the first pad at least, and the first support of the carrier, exhibit partially complementary profiles which fasten the first pad with respect to the carrier and in which the second lateral lug of the first pad at least, and the second support of the carrier, exhibit respective regions in contact with each other and ensuring that the first pad bears continuously against the carrier.

According to one possible embodiment of the invention, the lateral lugs of the first pad may be rounded.

Irrespective of the embodiment, it may be advantageous further to provide for the spring to include an additional branch bearing against the tip of the caliper in order to urge the first pad in translation.

Further features and advantages of the invention will emerge clearly from the description thereof given hereafter by way of non-limiting indication with reference to the appended drawings.

BRIEF DESCRIPTION OF THE DRAWINGS

FIG. 3 is a view similar to that of FIG. 2, distinguishable therefrom merely in that it illustrates, in a less complete and more diagrammatic fashion, another embodiment of a disk brake in accordance with the invention;

FIG. 4 is a part section view in the direction of the arrows 4—4 of FIG. 3, and enlarged;

FIG. 5 is an enlarged view of the spring illustrated in FIG. 3; and

FIG. 6 is a part section view in the direction of the arrows 6—6 of FIG. 3, and enlarged.

DETAILED DESCRIPTION OF THE INVENTION

Figure 1:
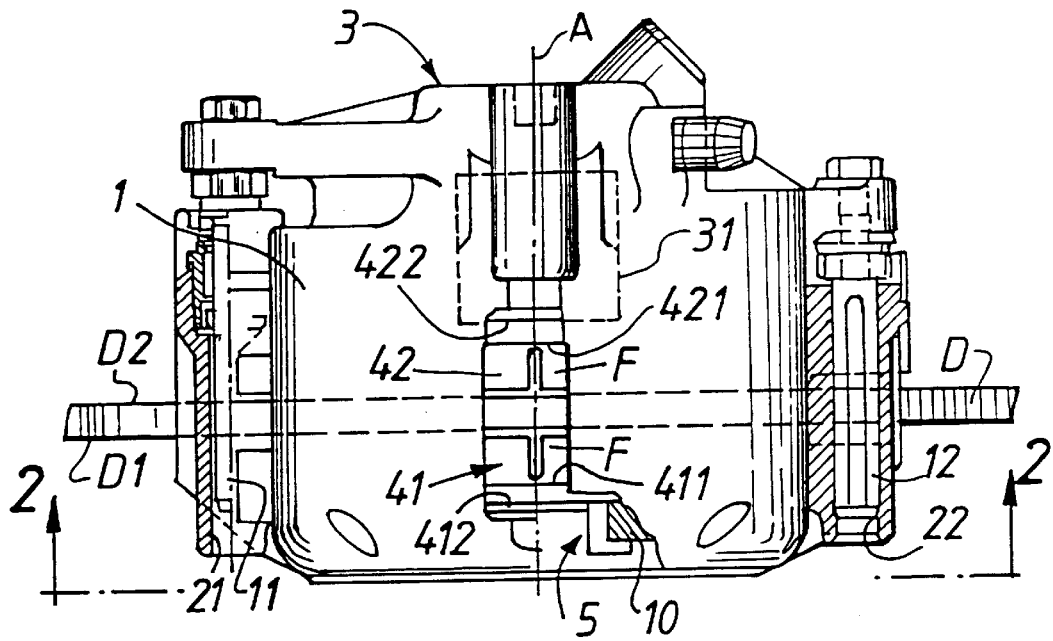
FIG. 1 is a plan view of a disk brake in accordance with the invention.
Figure 2:
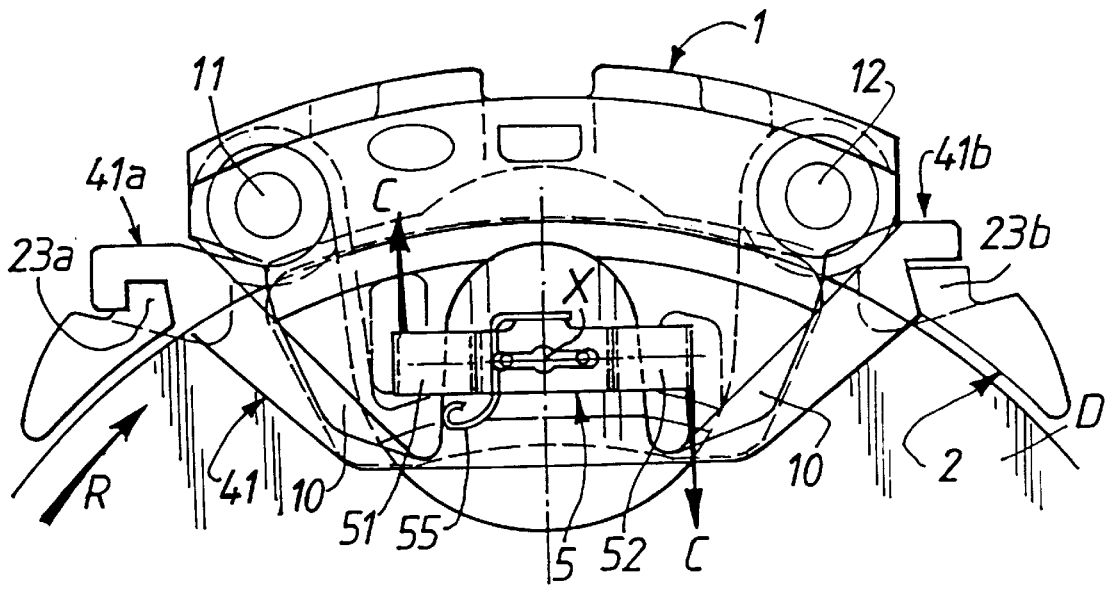
FIG. 2 is a front view of the disk brake of FIG. 1, viewed in the direction identified by the arrows 2—2 of FIG. 1.

As shown especially in FIGS. 1 and 2, the invention relates in general to a disk brake, such a brake conventionally comprising: two brake elements which can move with respect to each other, one of which is a caliper 1 straddling a brake disk D and the other of which is a carrier 2 fixed to the vehicle; clamping means comprising a tip of a caliper 10, the tip consisting of a flat shaping of the caliper formed facing a first face Di of the disk D, and a cylinder 3 connected to the caliper 1 and closed by a piston 31 turned toward a second face D2 of the disk D; guide means, such as guide pins 11, 12, connected to the caliper and sliding in bores 21, 22 of the carrier, to allow the caliper 1 to slide with respect to the carrier 2 under the effect of urging from the clamping means; and first and second friction pads 41 and 42.

These first and second friction pads 41 and 42 are turned respectively toward the first and second faces D1 and D2 of the disk D (FIG. 1), are clamped between the piston 31 and the tip 10 of the caliper 1 and are capable of being moved in the axial direction A of the piston 31 by an increasing pressure in the cylinder 3, by virtue of which the piston 31 on the one hand and the tip 10 of the caliper 1 on the other hand apply them against the disk D.

Each pad such as 41 or 42 includes two substantially flat faces such as 411, 412 and 421, 422, the first 411, 421 of which is partially covered, in a central region, with a friction material F (FIG. 1).

Each pad further includes, on either side of this central region, two lateral lugs such as 41a and 41b, the lugs of the first pad at least interacting with the respective supports 23a, 23b of the carrier 2.

Furthermore, on its second face 412, the first pad 41 carries an elongate spring 5, with two main branches 51 and 52, which is oriented in a tangential direction of the disk D, is intended to hold the first pad 41 on the tip 10 of the caliper, and elastically clamps the tip 10 of the caliper between the respective free ends 510, 520 of its two branches and the second face 412 of this first pad.

It is important, for the invention, for the spring 5 to be secured to the second face 412 of the first pad 41 in a way which prevents any relative rotation of this spring and of this pad, and for example by means of two spaced-apart anchoring points 53, 54.

According to the invention, the ends 510, 520 of the two main branches 51, 52 of the spring 5 point toward the tip 10 of the caliper (FIGS. 4 and 6) and bear elastically against respective bearing surfaces 130, 140 of the tip 10 of the caliper.

Moreover, these bearing surfaces 130, 140 are inclined both with respect to the axial direction A of the piston and with respect to the first face D1 of the disk, and exhibit opposite slopes with respect to the axial direction A of the piston, so as partially to convert the elastic bearing of the free ends 510, 520 of the branches 51, 52 of the spring 5 on the bearing surfaces 130, 140 into a torque C—C urging the first pad 41 to rotate about an axis X parallel to the axial direction A of the piston and, in this case, coincident with the axis of the piston in FIGS. 2 and 3.

As FIGS. 4 and 6 show, the bearing surfaces 130, 140 may be formed adequately by the edges of two respective V-shaped grooves 13 and 14 cut in the tip 10 of the caliper.

Furthermore, the free ends 510, 520 of the main branches 51, 52 of the spring 5 are preferably cut into a point with a rounded end in order to be able to slide better over the bearing surfaces 130, 140.

The invention is particularly advantageous in the case, illustrated in FIGS. 2 and 3, in which the first lateral lug 41a of the first pad 41 at least, and the first support 23a of the carrier 2, exhibit partially complementary profiles which fasten the first pad 41 with respect to the carrier 2, and in which the second lateral lug 41b of the first pad 41 at least, and the second support 23b of the carrier 2, exhibit respective regions in contact with each other and ensuring that the first pad bears continuously against he carrier.

In point of fact, in such a configuration, in which the disk D is assumed to have a favoured direction of rotation indicated by the arrow R, the torque C—C which urges the first pad 41 to rotate about the axis X has the effect of reinforcing the holding of each of the two ends of this pad by the carrier.

By way of indication, and as shown in FIG. 3, the lateral lugs 41a, 41b of the first pad at least may be rounded.

Irrespective of the shape of these lugs, it may further be advantageous, as illustrated in FIGS. 2, 3 and 5, for the spring 5 to include an additional branch 55 bearing against the tip 10 of the caliper, in order to urge the first pad 41 in translation and reinforce its contacts with the carrier.

We claim:

1. A disk brake for a motor vehicle, comprising: first and second brake elements which can move with respect to each other, one of said first and second brake elements being a caliper which straddles a brake disk and the other of said first and second brake elements being a carrier which is fixed to the vehicle; clamping means including a tip of said caliper, said tip consisting of a flat shaping on said caliper which faces a first face of said disk, and a cylinder connected to said caliper and closed by a piston turned toward a second face of said disk; guide means which allows said caliper to slide with respect to said carrier under the effect of urging from said clamping means; and first and second friction pads turned respectively toward said first and second faces of said disk, clamped between said piston and said tip of said caliper and moved in an axial direction of said piston by urging from said clamping means until said first and second friction pads are applied against said disk; each of said first and second pads having substantially first and second flat faces, said first flat face being partially covered with a friction material, said first flat face having first and second lateral lugs; said first and second lugs of said first pad interacting with first and second respective supports of said carrier; and the first pad carrying, on said second face, an elongate spring, said elongate spring having first and second main branches which point in a tangential direction of said disk, said elongate spring holds said first pad on said tip of said caliper and elastically clamps said tip of said caliper between the respective free ends of said first and second main branches and said second face of said first pad, characterized in that said first and second main branches of said elongate spring have the ends which point toward said tip of said caliper and bear elastically against respective first and second bearing surfaces of said tip of said caliper, said bearing surfaces inclined both with respect to said axial direction of said piston and with respect to said first face of said disk, said first and second bearing surfaces having opposite slopes with respect to said axial direction of said piston to partially convert said elastic bearing of said first and second free ends of said branches of said spring on said bearing surfaces into a torque for urging said first pad to rotate about an axis parallel to said axial direction of said piston.

2. The disk brake according to claim 1, wherein said first and second bearing surfaces are formed by edges of first and second respective V-shaped grooves cut in said tip of said caliper.

3. The disk brake according to claim 1, wherein said first and second free ends of said first and second branches of said spring are cut into a point with a rounded end.

4. The disk brake according to claim 1, wherein at least said first lateral lug of said first pad and said first support of said carrier, exhibit partially complementary profiles which fasten said first pad with respect to said carrier, and at least said second lateral lug of said first pad and said second support of the carrier, exhibit respective regions in contact with each other to ensure that said first pad bears continuously against said carrier.

5. The disk brake according to claim 1, characterized in that said first and second lateral lugs of said first pad at least are rounded.

6. The disk brake according to claim 1, characterized in that said elongate spring includes an additional branch which bears against said tip of said caliper.

* * * * *